W. W. BLAKELY.
WHEEL BLOCK.
APPLICATION FILED MAR. 5, 1920.
1,429,921. Patented Sept. 26, 1922.
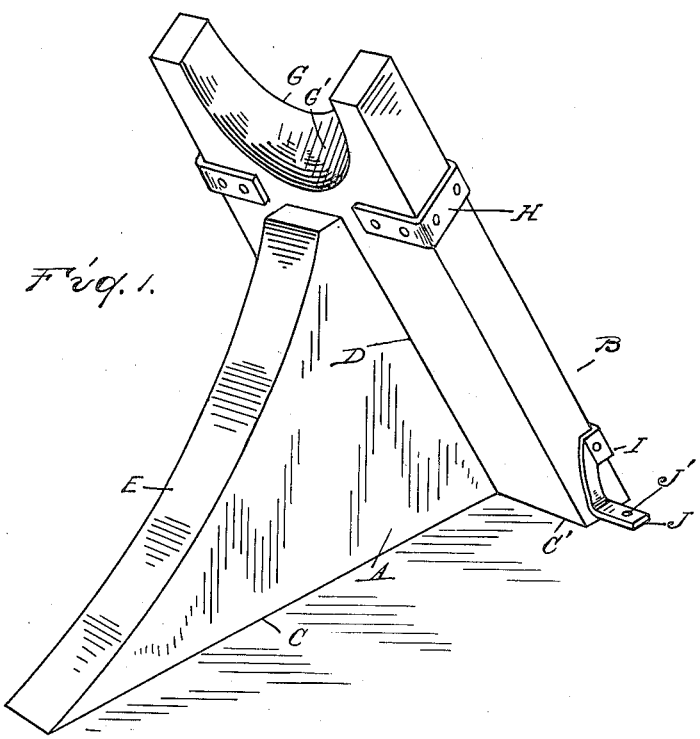
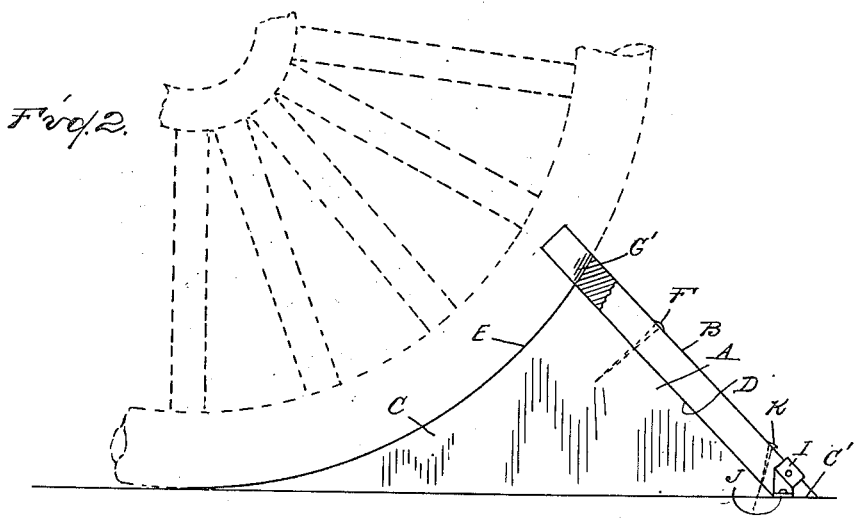
Inventor
William W. Blakely
By Whittemore Hulbert & Whittemore
Attorneys Patented Sept. 26, 1922.

1,429,921

UNITED STATES PATENT OFFICE.

WILLIAM W. BLAKELY, OF DETROIT, MICHIGAN.

WHEEL BLOCK.

Application filed March 5, 1920. Serial No. 363,538.

*To all whom it may concern:*

Be it known that I, WILLIAM W. BLAKELY, a citizen of the United States of America, residing at Detroit, in the county of Wayne, and State of Michigan, have invented certain new and useful Improvements in Wheel Blocks, of which the following is a specification, reference being had therein to the accompanying drawings.

This invention relates to wheel blocks such as are adapted to be engaged by the wheels of vehicles and more particularly motor vehicles during shipment of the same to hold such vehicles against movement within their conveyances.

It is the object of the invention to provide a wheel block having an arcuate face for engagement by a vehicle wheel and having a reinforcing portion recessed to embrace the tire of the wheel engaged by said face so as to restrain said wheel and vehicle against lateral movement.

In the drawings:

Figure 1 is a perspective view of the invention;

Figure 2 is a sectional view thereof, the engaged vehicle wheel being indicated in the dash lines.

In these views the reference characters A and B designate two members, preferably formed of wooden planking, which comprise the block. The member A is of substantially triangular shape, the longest side C thereof forming a supporting face and the shortest side D being inclined substantially 45° to the face C and providing a seat for the member B, the two members B and C being transverse. The other edge face E of the member A is acuate to conform to the circumference of standard automobile wheels, the edge C being in approximately tangential relation to said arc. The member B has a base face C' substantially in the plane of the edge C, and said member is secured to the member A by nails or other suitable fastenings F. The upper end portion of the member B is formed with a semi-circular or U-shaped recess G proportioned to snugly receive the tire of the wheel which engages the arcuate face E, the bottom portion of said recess being transversely bevelled as indicated at G' to form a continuation of the arc E. A reinforcing metal strap H embraces the upper portion of the member B to safeguard the same against splitting due to such lateral stresses as may be transmitted from the engaged vehicle wheel. To the lower portion of the member B there is secured a metal strap I, the extremities of which project at each side of said member and are down-turned and bent, as indicated at J to rest upon the floor supporting the wheel block and to form a means for anchoring the block to the floor. J' indicates the holes in the strap extremities J for engagement by the anchoring nails. A further anchorage for the block may be established by nailing through the member B directly into the floor, as indicated at K.

It is to be noted that the member B is adapted to occupy a substantially radial relation to the wheel engaging the block and consequently to offer a maximum resistance to the wheel. The members A and B mutually reinforce each other and provide a much stronger block than has heretofore been employed for like purpose, and furthermore, lateral movement of the vehicle is prevented by seating of the wheels within the U-shaped recess G.

What I claim as my invention is:

1. A wheel block comprising a substantially triangular member having an arcuate face adapted to conform to a vehicle wheel, a base face substantially tangential to said arcuate face, the other face of the triangle being inclined at substantially 45° to the base face.

2. A wheel block comprising two transversely arranged members, one of which is provided with an arcuate face adapted to conform to the circumference of a standard motor vehicle wheel and the other being formed with a U-shaped recess for engaging the tire of the wheel seated against said arcuate face.

3. A wheel block comprising two transverse members, one of which is provided with an arcuate face adapted to conform to the circumference of the motor vehicle wheel and the other of which is formed with a U-shaped recess having its bottom portion bevelled to form an extension of the curve of said arcuate face.

4. A wheel block comprising two transversely arranged members, having their respective faces inclined to form a seat for a motor vehicle wheel, one of said members being formed with a U-shaped recess for engaging the tire of said wheel.

5. A wheel block comprising two transversely arranged members, one of which is formed with an arcuate face for seating a motor vehicle wheel, and the other of which is oppositely inclined to said face and is adapted to restrain said wheel against lateral movement.

6. A wheel block comprising two transversely arranged members, one of which is formed with an arcuate face for seating a motor vehicle wheel, and the other of which is inclined at substantially 45° to the base of the block, and a metal strap secured to the last mentioned member terminally providing anchorage members for the block.

7. A wheel block comprising two transversely arranged members, one of which is formed with an arcuate face for seating a motor vehicle wheel and the other of which is inclined to said face and provided with metallic straps near its upper and lower ends for reinforcing and securing the device to the floor respectively.

In testimony whereof I affix my signature.

WILLIAM W. BLAKELY.